No. 879,211. PATENTED FEB. 18, 1908.
J. P. TEBYRICÁ & W. HALSTEAD.
COFFEE SHELLER.
APPLICATION FILED AUG. 10, 1906.
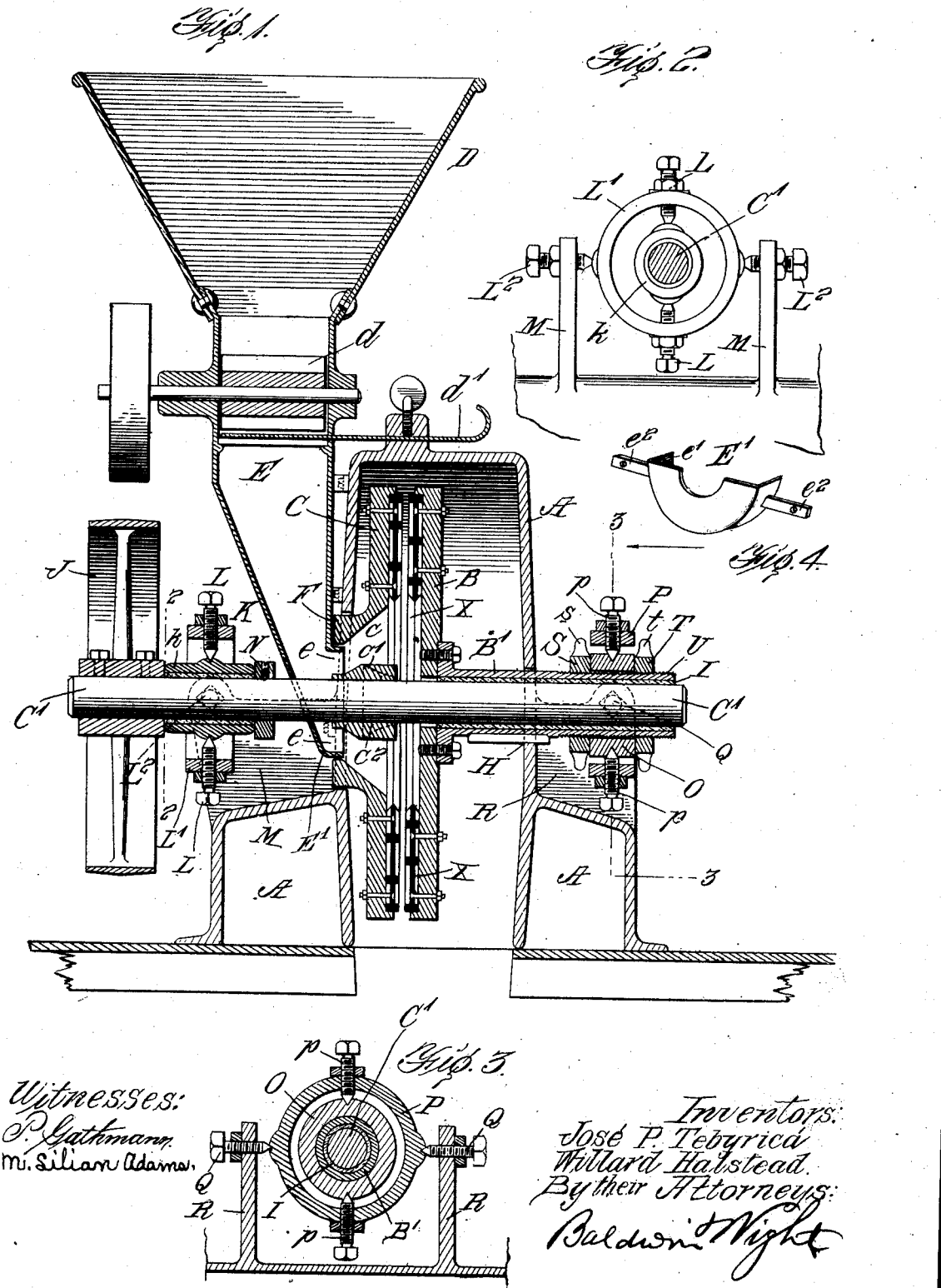
Witnesses:
P. Gathmann.
M. Lilian Adams.
Inventors:
José P. Tebyricá
Willard Halstead.
By their Attorneys:
Baldwin Wight

UNITED STATES PATENT OFFICE.

JOSÉ P. TEBYRICÁ, OF SAN PAULO, BRAZIL, AND WILLARD HALSTEAD, OF SYRACUSE, NEW YORK; SAID TEBYRICÁ ASSIGNOR TO THE ENGELBERG HULLER COMPANY, OF SYRACUSE, NEW YORK, A CORPORATION OF WEST VIRGINIA.

COFFEE-SHELLER.

No. 879,211.      Specification of Letters Patent.      Patented Feb. 18, 1908.

Application filed August 10, 1906. Serial No. 330,037.

*To all whom it may concern:*

Be it known that we, JOSÉ P. TEBYRICÁ, a citizen of Brazil, residing at San Paulo, Brazil, and WILLARD HALSTEAD, a citizen of the United States, residing at Syracuse, in the county of Onondaga and State of New York, have invented certain new and useful Improvements in Coffee-Shellers, of which the following is a specification.

Our present improvements relate to machines especially adapted for shelling coffee berries but they may be embodied in machines for grinding grain and other material.

In hulling or shelling coffee or rather cracking off the shells from the coffee beans it is very important that none of the coffee berries should be broken. We have devised improved means whereby the shelling or grinding plates may be adjusted and positively held at a suitable distance apart to properly crack the shell on the cherry coffee and yet not injure or break the coffee bean.

In the accompanying drawings:—Figure 1 shows a vertical central section through a machine adapted to shell coffee cherries embodying our improvements. Fig. 2 is a detail view in section on the line 2—2 of Fig. 1. Fig. 3 is a detail view in section on the line 3—3 of Fig. 1. Fig. 4 is a perspective view of a part of the feed-spout.

The casing, A, incloses the shelling or grinding heads, B, and C, which are connected respectively with the sleeve, B', and the rotating shaft, C'. The hopper, D, is provided with feed devices, $d$ and an adjustable slide or gate, $d'$, and with a spout, E, which communicates with the shellers or grinders. At its lower end the spout is formed with a circular discharge opening or mouth, $e$, which projects laterally through a circular opening in the casing surrounding the driving shaft, C'. Preferably the lower part of the spout below the shaft, C', is made of a detachable section, E', (Fig. 4), so that the spout may be applied to the shaft laterally. This section is formed with a semicircular flange, $e'$, that projects into the feed opening of the grinders and it has laterally projecting arms, $e^2$, by means of which it may be attached to the casing. The shelling or grinding head, C, is formed with an annular opening, $c$, surrounding the hub, $c'$, to allow grain to pass from the spout to the shelling or grinding surfaces between the heads and this opening is bridged by arms, $c^2$, radiating from the hub.

Surrounding the opening, $c$, and projecting laterally from the head, C, is an annular flange, F, which projects through the opening in the casing and runs close to the outer edge or wall of said opening. It also runs close to the outer face of the lateral projection, $e$, of the spout. By this arrangement tendency to leakage of unground grain or unshelled coffee is prevented, but should there be any leakage of the unground or unshelled grain or coffee, it will all pass to the outside of the mill as obviously it would not under any circumstances pass to the outside and then re-enter the casing. This construction, however, has already been patented and is not claimed as part of our invention.

The stationary head, B, is bolted or otherwise secured to the sleeve, B', which is keyed at, H, to the casing, A, and contains a bearing of Babbitt metal or other suitable material, I. The rotating shaft, C', extends through the sleeve, B' and carries on its opposite end a driving pulley, J. The rotating head, C, is firmly attached to this shaft as indicated and the shaft is supported in a self adjusting box, K, shown as consisting of a sleeve, $k$, lined with Babbitt metal and engaged by set screws, L, supported on a ring, L', surrounding the sleeve and in turn supported by set screws, L², mounted on arms, M, projecting from the main frame or casing. The pulley, J, is secured to the shaft, C', close to the sleeve, $k$, and a collar, N, is keyed to the shaft close to the opposite end of the sleeve. In this way the shaft is prevented from moving endwise in the sleeve while free to rotate therein and as will be observed by reference, especially to Fig. 2, the shaft is self-adjusting within proper limits.

The sleeve, B', extends through a ring, O, as shown in Fig. 3 and this ring is surrounded by another ring, P, carrying set screws, $p$, that engage the ring, O, on opposite sides. The ring, P, is suspended from set screws, Q, supported in arms, R, projecting from the frame or casing, A. This construction also provides a self-adjusting bearing. The ends of the set screws in both the bearings referred to are coned as shown for this purpose. On opposite sides of the ring, O, are arranged nuts, S, T, provided with handles, $s$, $t$, by means of which they can be easily turned. These nuts engage a screw-thread, U, on the surface of the sleeve, B', and they lie close to opposite sides of the ring, O. By these devices the sleeve, B', and the head, B, carried thereby can be adjusted towards and from the head, C. A very fine adjustment can be obtained and when the adjustment is once made it is a secure and permanent one. The heads, B and C, carry suitable plates or segments, X, which are suitably formed either to remove the shells from coffee berries or to grind grain or for other similar purposes.

We claim as our invention:—

The combination of a stationary head, a sleeve to which it is secured, a rotary head, a shaft to which it is secured and which extends through and has its bearings in the sleeve of the stationary head, a self-adjusting bearing for the rotary shaft, a self-adjusting bearing for the sleeve and adjusting nuts on opposite sides of said sleeve bearing which engage a thread on the sleeve for adjusting the stationary head towards and from the rotary head.

In testimony whereof, we have hereunto subscribed our names.

JOSÉ P. TEBYRICÁ.
WILLARD HALSTEAD.

Witnesses as to the signature of José P. Tebyricá:
L. O. HOWE,
GROVER D. RETZBACH.

Witnesses as to the signature of Willard Halstead:
LEROY BRATT,
GROVER D. RETZBACH.